United States Patent
Boehde

(10) Patent No.: US 9,810,469 B2
(45) Date of Patent: Nov. 7, 2017

(54) VARIABLE FAN SPEED CONTROL IN HVAC SYSTEMS AND METHODS

(71) Applicant: TRANE INTERNATIONAL INC., Piscataway, NJ (US)

(72) Inventor: Michael Carl Boehde, Onalaska, WI (US)

(73) Assignee: TRANE INTERNATIONAL INC., Davidson, NC (US)

(*) Notice: Subject to any disclaimer, the term of this patent is extended or adjusted under 35 U.S.C. 154(b) by 1000 days.

(21) Appl. No.: 14/050,785

(22) Filed: Oct. 10, 2013

(65) Prior Publication Data

US 2014/0096547 A1    Apr. 10, 2014

Related U.S. Application Data

(60) Provisional application No. 61/711,938, filed on Oct. 10, 2012.

(51) Int. Cl.
| | | |
|---|---|---|
| F25D 17/00 | (2006.01) | |
| F25B 39/04 | (2006.01) | |
| F25B 41/00 | (2006.01) | |
| F25B 49/02 | (2006.01) | |
| F04D 27/00 | (2006.01) | |
| F24F 1/06 | (2011.01) | |
| F24F 1/50 | (2011.01) | |

(Continued)

(52) U.S. Cl.
CPC .......... F25B 49/027 (2013.01); F04D 27/004 (2013.01); F04D 27/0261 (2013.01); F24F 1/06 (2013.01); F24F 1/50 (2013.01); F24F 11/0079 (2013.01); F25B 2700/2106 (2013.01); Y02B 30/746 (2013.01)

(58) Field of Classification Search
CPC .. F04D 27/004; F04D 27/0261; F25B 49/027; F25B 2700/2106; F25B 2700/172; F24F 1/06; F24F 1/50; F24F 11/0079; Y02B 30/746
USPC ............ 62/208, 209, 89, 181, 177, 178, 183
See application file for complete search history.

(56) References Cited

U.S. PATENT DOCUMENTS 4,364,237 A * 12/1982 Cooper .................. F24F 11/085
62/160
5,067,560 A    11/1991 Carey et al.
(Continued)

FOREIGN PATENT DOCUMENTS

| CN | 101603751 A | 12/2009 |
|---|---|---|
| CN | 101968250 A | 2/2011 |

(Continued)

OTHER PUBLICATIONS

International Search Report for PCT/US2013/064283, dated Jan. 22, 2014, 3 pages.
(Continued)

*Primary Examiner* — Joseph Trpisovsky
(74) *Attorney, Agent, or Firm* — Hamre, Schumann, Mueller & Larson, P.C.

(57) ABSTRACT

Generally, a variable fan speed control in an HVAC system is described. Such methods and systems to control fan speed can in turn improve efficiency of the HVAC system by minimizing power consumption, for example of the compressor. The control scheme is based on various operating conditions of compressor load and ambient air temperature, which are used to determine an optimum fan speed.

7 Claims, 4 Drawing Sheets

(51) Int. Cl.
*F24F 11/00* (2006.01)
*F04D 27/02* (2006.01)

(56) References Cited

U.S. PATENT DOCUMENTS

| | | |
|---|---|---|
| 5,138,844 A | 8/1992 | Clanin et al. |
| 5,385,030 A * | 1/1995 | Kitagawa ............... F25B 9/006 62/114 |
| 5,605,053 A * | 2/1997 | Otori ................. F24F 11/0009 62/160 |
| 5,823,004 A | 10/1998 | Polley et al. |
| 6,257,007 B1 | 7/2001 | Hartman |
| 6,779,353 B2 | 8/2004 | Hu et al. |
| 7,963,117 B2 | 6/2011 | Allen et al. |
| 7,975,495 B2 | 7/2011 | Voorhis et al. |
| 8,051,668 B2 | 11/2011 | Singh et al. |
| 8,096,139 B2 | 1/2012 | Taras et al. |
| 8,299,646 B2 | 10/2012 | Rockenfeller et al. |
| 8,413,454 B2 | 4/2013 | Butler et al. |
| 2003/0014986 A1 * | 1/2003 | Crane ................... F25B 49/022 62/183 |
| 2009/0229288 A1 | 9/2009 | Alston et al. |
| 2011/0083454 A1 * | 4/2011 | Kopko ................. F25B 49/027 62/115 |
| 2011/0137522 A1 | 6/2011 | Mola et al. |
| 2011/0197601 A1 | 8/2011 | Booth et al. |
| 2012/0137713 A1 | 6/2012 | Duraisamy et al. |
| 2012/0198865 A1 | 8/2012 | Lockwood |
| 2012/0227427 A1 | 9/2012 | Liu et al. |

FOREIGN PATENT DOCUMENTS

| | | |
|---|---|---|
| JP | 8-121848 | 5/1996 |
| JP | 10-30853 | 2/1998 |
| JP | 10-185284 | 7/1998 |
| KR | 10-2008-0080677 | 9/2008 |

OTHER PUBLICATIONS

Written Opinion PCT/US2013/064283, dated Jan. 22, 2014, 7 pages.
"Condenser Fan Pak", Schneider Electric PowerPoint Presentation, Applicant aware of presentation as early as Jun. 2013, 14 pages.

* cited by examiner

VARIABLE FAN SPEED CONTROL IN HVAC SYSTEMS AND METHODS

FIELD

The disclosure herein relates to heating, ventilation, and air-conditioning ("HVAC") systems and methods, and more particularly to a variable fan speed control used in such HVAC systems and methods. Generally, systems and methods are described that are directed to controlling fan speed to thereby control power consumption, for example by the HVAC compressor(s) and fan(s). The control is based on various operating conditions of compressor load and ambient air temperature.

BACKGROUND

In HVAC units and systems, condenser fans are used such as in water chillers to reject heat from refrigerant flowing through the system. Heat can be rejected from the refrigerant, for example to some other fluid such as air or water, or to ambient. Control of the condenser fans can be operated to minimize head pressure on the compressor(s), such as by maximizing the number of fans running in units/systems that use fixed speed fans. Such control can maximize chiller efficiency, such as at full load.

SUMMARY

At many operating conditions, a chiller may not be operating at full load. For chillers that have variable speed fan(s) and/or fans with a multiple number of fan stages or discrete steps, and that have variable speed compressor(s), a method to determine the optimum fan speed based on chiller operating condition is needed and improvements may be made to fan control in HVAC units or systems. Generally, systems and methods of variable fan speed control are described. Power optimization such as in a chiller can be achieved, by the methods/systems herein, at various unloaded conditions, i.e. conditions not at full load or at partial load. The systems and methods herein have been founded on an observation, for example that lowering fan speed under certain conditions, can save power relative to a cost associated with a corresponding increase in head pressure on the compressor.

Generally, the control can be functionally based on an algorithm implemented into software and control program and which is suitable for use to control the fan(s) of a unit, such as a cooling unit or a heat pump used in a cooling mode. For example, such a unit can be an air cooled water chiller with one or more variable speed compressors and one or more variable speed fans, such as may be used in HVAC systems, can employ the control methods and systems described herein.

The control is based on various operating conditions of compressor load and ambient air temperature.

In one embodiment, a method of controlling condenser fan speed in an HVAC system includes detecting, with a sensor, ambient air temperature and then obtaining a present load on a variable speed compressor. With a controller, a target differential pressure between a condenser and an evaporator can be determined, which can be based on the ambient air temperature detected and the present load on the variable speed compressor obtained. With the controller, a condenser fan speed can be outputted to obtain fan capacity and that is suitable to achieve the target differential pressure determined, and such that the power of the HVAC system is managed through a relative power consumed by the variable compressor and the fans. One or more variable speed fan(s) and/or fan(s) with a multiple number of fan stages or discrete steps can be controlled based on the output of condenser fan capacity, e.g. based on fan speed.

In one embodiment, an HVAC system can include a unit, such as an air cooled water chiller. The system includes one or more variable speed fan(s) and/or fans with a multiple number of fan stages or discrete steps, a variable speed compressor, a condenser, an evaporator, a device to detect ambient air temperature, and a device to obtain present load on the variable speed compressor. The system includes a controller to determine a target differential pressure between the condenser and the evaporator based on the ambient air temperature detected and the present load on the variable speed compressor obtained. The controller also can determine an output of condenser fan speed to achieve a fan capacity suitable to achieve the target differential pressure determined. The controller can operate the one or more fans based on the output of condenser speed to achieve fan capacity, and such that the power of the HVAC system is managed through a relative power consumed by the variable compressor and the fans.

It will be appreciated that the use of target differential pressure is just one example of a control parameter obtained from compressor load, and is not meant to be limiting. It will be appreciated that the input(s) of compressor load, such as for example the compressor speed, and the input of ambient temperature could be used to output fan speed directly.

Other features and aspects of the systems, methods, and control concepts will become apparent by consideration of the following detailed description and accompanying drawings.

BRIEF DESCRIPTION OF THE DRAWINGS

Reference is now made to the drawings in which like reference numbers represent corresponding parts throughout.

DETAILED DESCRIPTION

Improvements may be made to fan control in HVAC units and/or systems. Generally, methods and systems are described to control fan speed of an HVAC unit and/or systems that has variable speed and/or fans with a multiple number of fan stages or discrete steps and variable speed compressor(s). The variable fan speed control is based on compressor load, e.g. compressor speed, and ambient temperature.

Figure 1:
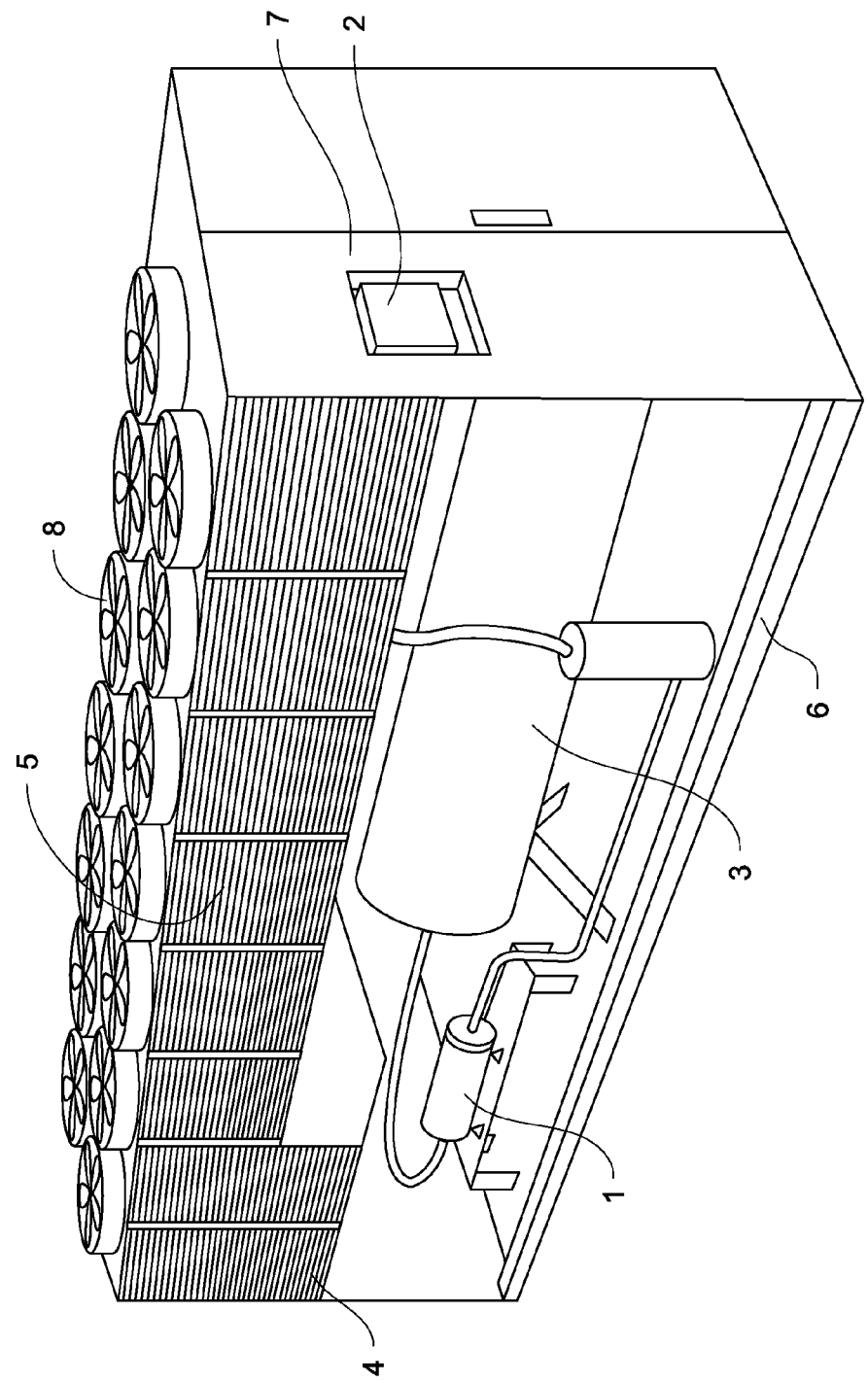
FIG. 1 is a schematic view of an HVAC system that can employ a variable fan speed control.

As to the basic design of an HVAC system, FIG. 1 shows a schematic view of a chiller unit in an HVAC system to control, e.g. variable speed fan(s). FIG. 1 shows one embodiment of an air cooled chiller that has a compressor 1, an evaporator 3, a condenser 4 with air coil 5 and fans 8, and a control unit 2 and panel 7. It will be appreciated that the compressor 1 is a variable speed compressor and the fans 8 may be variable speed and/or fans with a multiple number of fan stages or discrete steps. The condenser 4 and its air coil 5 in the embodiment shown are one example of an air cooled condenser, however it will be appreciated that the specific condenser 4/coil 5 combination shown is merely exemplary. The chiller can be considered a single unit within the HVAC system and be supported by a frame 6 for example. It will be appreciated that the specific configuration shown in FIG. 1 is merely exemplary, as other chiller designs, layouts, and specific configurations may be employed. For example, the chiller of FIG. 1 is a known chiller with "W" shaped coils, however, it will be appreciated that other coil types may be used, such as for example multiple "V" shaped coils or more than one circuit employing multiple compressors, evaporators, condensers. Generally, the methods and systems to control fan speed may be employed in any type of air cooled chiller unit with variable speed and/or with fan(s) that have a multiple number of fan stages or discrete steps and variable speed compressor(s).

Figure 2:
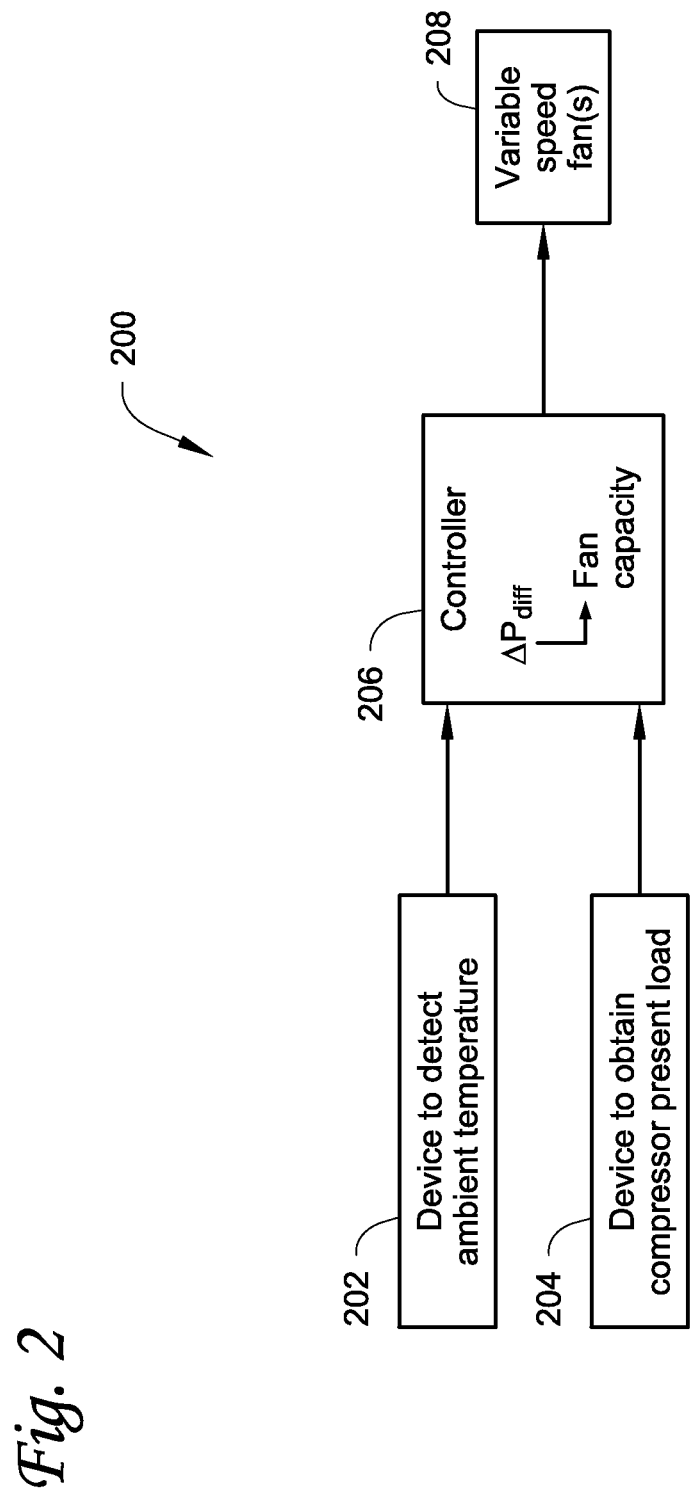
FIG. 2 is a scheme of a system of variable fan speed control.

FIG. 2 is a scheme of variable fan speed control 200 that can include devices to detect, obtain, or otherwise determine the inputs needed for a controller to determine the appropriate output to control fan speed. In one embodiment, a device 202 is used to detect an ambient air temperature. The device 202 may be any suitable sensor that can measure the ambient air temperature, for example external or outdoor temperature, and communicate the ambient temperature measurement to controller 206. It will be appreciated that the device 202 may be a sensor mounted near the airside coils (e.g. 5 in FIG. 1). A device 204 is used to obtain the present load on the compressor of the circuit. It will be appreciated that the device 204 can be any suitable detector, sensor, meter that can determine the present load on the compressor, of which some examples are provided below. In some embodiments, the present load is based on a compressor's running speed, which in some examples may be expressed as a percentage of rated speed for a particular compressor frame size, e.g. relative to the compressor full speed configured limit. The device 204 is to communicate for example, the percentage of rated speed of the compressor to the controller 206. The devices 202, 204 can periodically update the measurements taken as needed and/or desired, such as automatically, during/after an operation change or changing conditions of the unit, and/or manually. It will be appreciated that the controller 206 can use the most recent sensor data available unless otherwise specified.

The controller 206 can be implemented into for example control unit 2 and panel 7 e.g. in FIG. 1. It will be appreciated that it is known that the control unit 2, such as shown in the air-cooled chiller of FIG. 1, generally can include a processor (not shown), a memory (not shown), and optionally a clock (not shown) and an input/output (I/O) interface (not shown), and the control unit 2 can be configured to receive data as input from various components within an HVAC system, such as the components shown in FIG. 1 and FIG. 2, and can also send command signals as output to various components within of the system.

The controller 206 uses the ambient temperature detected and the compressor load obtained to determine a target differential pressure $\Delta P_{diff}$ between the evaporator and condenser (e.g. evaporator 3 and condenser 4 of FIG. 1). The target differential pressure can be a function of ambient temperature and compressor load, which may be employed in an algorithm implemented in a control program to vary the fan speed as needed and/or desired for the appropriate fan capacity, e.g. by control of variable speed fan(s) 208.

It will be appreciated that the target differential pressure can be added to the suction pressure from the compressor to get a target discharge pressure of the compressor. As the fans may change speed to reach a target discharge pressure of the compressor, the unit capacity, e.g. of the chiller, can also change causing a new compressor speed. The new compressor speed can then in turn change the output target differential pressure across the compressor. The chilled water temperature control then drives the chiller to the appropriate chiller capacity.

The fan control can determine the optimum fan speed to minimize total power consumption at that unit capacity, such as by using the compressor load and the ambient temperature to obtain the output target differential pressure. The output target differential pressure in turn can be used to determine the appropriate fan capacity, e.g. based on the resulting fan speed that can minimize total power consumption at that unit capacity, for example the relative power consumed by the compressor and by the fans.

It will be appreciated that compressor speed in rpm can be commanded by the controller, e.g. 206, in response to, for example, the chiller water temperature control loop of a water chiller, and can and/or would be known by the controller. In the methods and systems described herein, differential pressure can be the controller output parameter, and compressor load (e.g. speed in rpm or relative value of rpm) can be the input parameter used to obtain the output parameter.

It will be appreciated that the use of target differential pressure is just one example of a control parameter obtained from compressor load, and is not meant to be limiting. It will be appreciated that the input(s) of compressor load, such as for example the compressor speed, and the input of ambient temperature could be used to output fan speed directly, rather than using them to first obtain the target differential pressure.

For example, in other situations where target differential pressure is not used as the control parameter, it would be appreciated that a typical speed sensor may be employed to obtain the compressor load, e.g. compressor speed, and that a look-up table may be employed, which has correlated compressor speed and ambient temperature. It also will be appreciated that, depending on the method of unloading of the compressor, mechanical unloader position sensor(s) may be considered to obtain the compressor load, e.g. compressor speed. In other embodiments, compressor load, e.g. compressor speed, could also be estimated indirectly such as for example by a change in evaporator water temperature obtained by the controller through use of for example temperature sensor(s).

In some embodiments, the controller 206 may employ a high pressure avoidance control to control fan capacity in multi-stages such as for example, when the condensing temperature approaches the condenser pressure limit, fan capacity can be added in discrete fixed speed fan stages in systems using variable speed fan(s) and/or fan(s) with a multiple number of fan stages or discrete steps.

Figure 3:
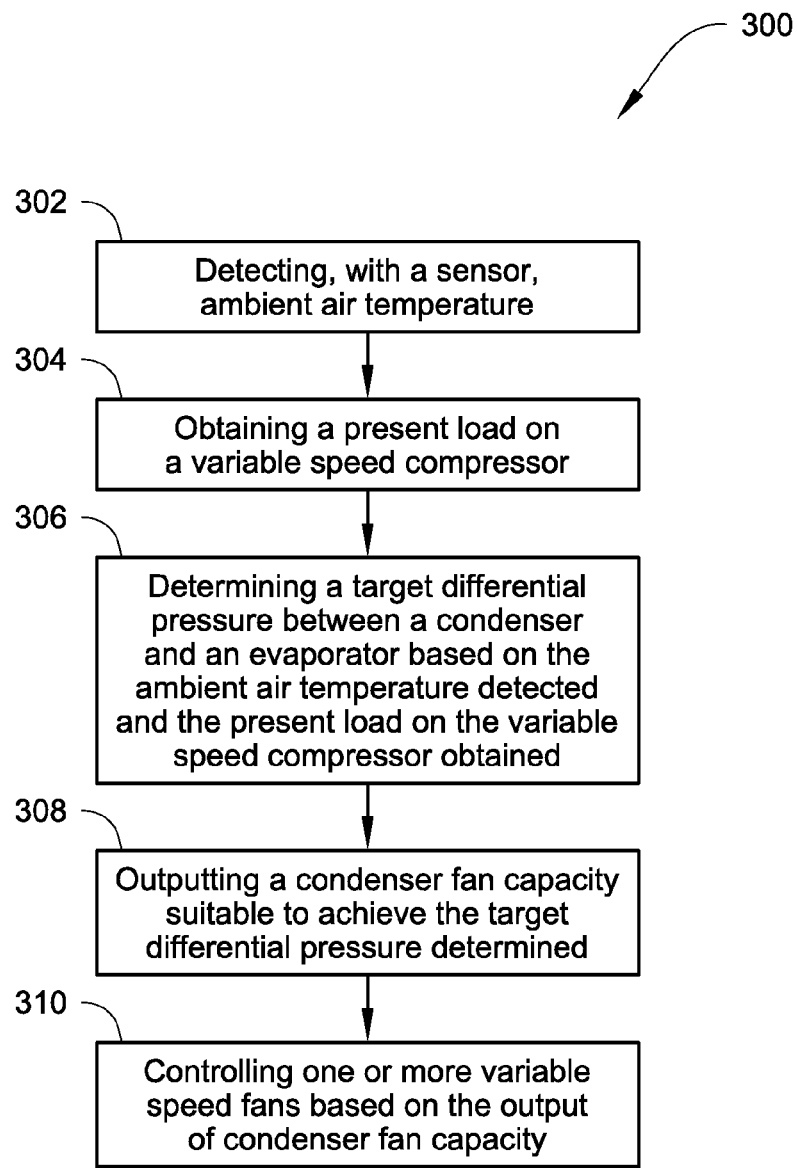
FIG. 3 is a flow chart of a method on a variable fan speed control.

FIG. 3 is a flow chart of one embodiment of a method 300 of variable fan speed control. The method 300 of controlling variable speed condenser fans in an HVAC system includes detecting, with a sensor, ambient air temperature 302 and then obtaining a present load on a variable speed compressor 304. With a controller, a target differential pressure between a condenser and an evaporator can be determined 306, which can be based on the ambient air temperature detected and the present load on the variable speed compressor obtained. With the controller, a condenser fan speed suitable to achieve a fan capacity can be outputted 308 and that is suitable to achieve the target differential pressure determined. One or more variable speed fans can be controlled 310 based on the output of condenser fan speed to achieve the fan capacity. It will be appreciated that the fans may be fans with a multiple number of fan stages or discrete steps, or a combination of variable speed fan(s) and fan(s) with a multiple number of fan stages or discrete steps.

Using a system with such a control, method, the differential pressure target can be varied based on a function of ambient temperature and compressor speed to optimize the fan speed, which can save power to the system, relative to potential costs due to increases in compressor head pressure. Historically, the differential pressure target was set at a fixed psi for a given, or clamped, ambient temperature such that the differential pressure target would not change despite the ambient temperature being lower than the given ambient temperature. At part load and full load operation conditions, the control can optimize the fan speed to obtain efficiencies in the circuit to allow trade-offs between condenser fan power (which can increase to keep system differential pressure relatively low) and compressor power (which can increase when system differential pressure increases).

Figure 4:
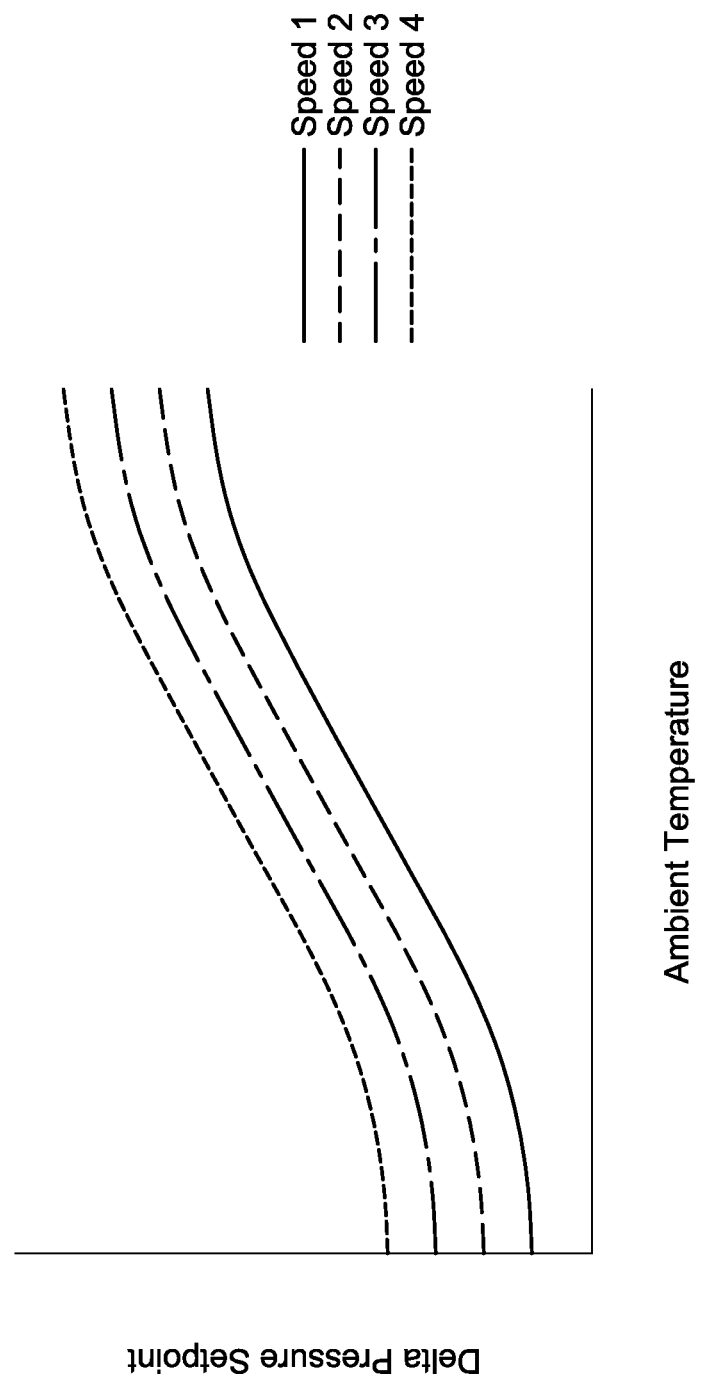
FIG. 4 shows an exemplary fan control regime using differential pressure setpoint based on compressor speed and ambient temperature.

FIG. 4 shows an exemplary fan control regime using differential pressure setpoint based on compressor speed and ambient temperature. As shown, the delta pressure setpoint can increase as a function of ambient temperature, as well as for different speeds, see graph lines e.g. for Speeds 1 to 4. In some examples, the delta pressure setpoint can be as low as about 35 psid, pounds per square inch differential, and can be as high as about 190 psid. It will be appreciated that the delta pressure setpoint can vary depending upon in general the unit operating/load conditions, and can vary depending on the oil flow needs through the unit/system. Part load efficiency of the circuit can be optimized, where the delta pressure can be set for various operating conditions of changing ambient temperature and compressor speed.

With regard to the foregoing description, it is to be understood that changes may be made in detail, without departing from the scope of the present invention. It is intended that the specification and depicted embodiments are to be considered exemplary only, with a true scope and spirit of the invention being indicated by the broad meaning of the claims.

The invention claimed is:

1. A method of controlling condenser fans in a heating, ventilation, and air conditioning (HVAC) system, comprising:
    detecting, with a device to detect ambient air temperature, ambient air temperature;
    obtaining, with a device to obtain compressor present load, a present load on a variable speed compressor;
    determining, with a controller, a target differential pressure between a condenser and an evaporator based on the ambient air temperature detected and the present load on the variable speed compressor obtained;
    outputting, with the controller, a condenser fan speed suitable to achieve the target differential pressure determined; and
    controlling one or more fans based on the output of condenser fan speed to obtain a fan capacity suitable to control one or more condenser fans, such that power of the HVAC system is managed through a power consumed by the variable speed compressor and the fans.

2. The method of claim 1, wherein the step of obtaining the present load comprises obtaining the present load through the device to obtain compressor present load which includes a mechanical unloader position sensor.

3. The method of claim 1, wherein the step of obtaining the present load comprises obtaining the present load by estimating a change in evaporator water temperature obtained through the device to obtain compressor present load which includes a temperature sensor.

4. A heating, ventilation, and air conditioning (HVAC) system, comprising:
    a variable speed compressor;
    an evaporator fluidly connected to the variable speed compressor;
    a condenser fluidly connected to the variable speed compressor;
    the condenser including one or more condenser fans;
    a device to detect ambient air temperature;
    a device to obtain present load on the variable speed compressor; and
    a controller operatively connected to the device to detect ambient air temperature, to the device to obtain present load on the variable speed compressor, and to the condenser including the one or more condenser fans;
    the controller configured to determine a target differential pressure between the condenser and the evaporator based on the ambient air temperature detected and the present load on the variable speed compressor obtained,
    the controller configured to determine an output of condenser fan capacity suitable to achieve the target differential pressure determined, and
    the controller configured to operate the one or more condenser fans based on the output of condenser fan capacity, such that power of the HVAC system is managed through power consumed by the variable speed compressor and the one or more condenser fans.

5. The system of claim 4, wherein the device to obtain compressor present load includes a mechanical unloader position sensor.

6. The system of claim 4, wherein the device to obtain compressor present load includes one or more temperature sensors configured to obtain the present load by estimating a change in evaporator water temperature.

7. The system of claim 4, wherein the controller, in determining the desired condenser fan capacity, is configured to determine the speed of the one or more condenser fans, and is configured to output the speed of one or more condenser fans to operate the one or more condenser fans based on the desired condenser fan capacity.

* * * * *